United States Patent Office 2,904,602
Patented Sept. 15, 1959

2,904,602

2-BROMO-3-CHLORO-1,1,3,3-TETRAFLUORO-PROPENE-1

Edgar M. Ilgenfritz, Midland, Mich., assignor to The Dow Chemical Company, Midland, Mich., a corporation of Delaware No Drawing. Application January 18, 1957
Serial No. 634,831

2 Claims. (Cl. 260—653.3)

This invention relates to a new halo organic compound and is more particularly concerned with 2-bromo-3-chloro-1,1,3,3-tetrafluoropropene-1 and a method whereby this compound may be prepared.

The compound of the present invention inhibits the growth of and kills specific organisms of bacteria and fungus, as well as specific insects in fumigation tests. It has utility as a fumigant, being active at relatively low concentrations.

Preparation of the compound of the present invention is readily accomplished by dehydrobromination of 1,2-dibromo-3-chloro-1,1,3,3-tetrafluoropropane, described and claimed in a copending application, Serial 634,832, filed concurrently herewith. Aqueous potassium hydroxide and the propane are refluxed together and the propene of the present invention separated and purified by distillation.

The following examples are given for the purpose of illustration only and are not to be construed as limiting the invention thereto.

Example

A three neck flask fitted with a stirrer, reflux condenser and dropping funnel was charged with 226 parts of $CF_2Br-CHBr-CF_2Cl$. A 10% molar excess of 20% potassium hydroxide was added slowly to the flask, with stirring, and the reaction mixture heated at reflux temperature for four and one half hours. The reaction mixture was cooled, the organic layer separated, the crude product washed with water and then dried over $CaSO_4$. Subsequent distillation of the product yielded $CF_2=CBr-CF_2Cl$, boiling at 63.5 degrees centigrade at 742 millimeters of mercury absolute.

2-bromo-3-chloro-1,1,3,3-tetrafluoropropene-1, $$CF_2=CBr-CF_2Cl$$

is a clear colorless liquid, having a specific gravity $(d_4^{25})$ of 1.866, a refractive index $(n_D^{25})$ of 1.3750, a molecular refraction of 27.9, and the sum of the atomic refractions is 28.1. Mass spectroscopic analysis confirmed the structures.

When vapors of the compound of the present invention are contacted with common bacteria- and mold-forming organisms in standard fumigation tests, an inhibition of growth or complete kill of the organisms resulted, even when quantities as small as 1 pound of compound per 1000 cubic feet of space fumigated were employed. In other fumigation tests, at concentrations as low as ½ pound of the compound of the present invention per 1000 cubic feet of space, 100 percent kills of both confused flour beetles and black carpet beetles were obtained in 16 hour exposure tests.

I claim:

1. 2-bromo-3-chloro-1,1,3,3-tetrafluoropropene-1.
2. The process which comprises: dehydrobrominating 1,2-dibromo-3-chloro-1,1,3,3-tetrafluoropropane by refluxing with aqueous potassium hydroxide, and, separating 2-bromo-3-chloro-1,1,3,3-tetrafluoropropene-1 from the reaction mixture.

References Cited in the file of this patent

UNITED STATES PATENTS

| | | |
|---|---|---|
| 2,671,799 | Miller | Mar. 9, 1954 |
| 2,691,036 | Miller | Oct. 5, 1954 |
| 2,700,688 | Crane et al. | Jan. 25, 1955 |
| 2,733,277 | Miller | Jan. 31, 1956 |
| 2,745,886 | Ruh et al. | May 15, 1956 |

OTHER REFERENCES

Henne et al.: Jour. Am. Chem. Soc., vol. 63, pages 3478 and 3479 (December 1941).

Simons: Fluorine Chemistry, vol. I (1950), Academic Press, Inc., New York, New York, pages 501 and 541.